United States Patent [19]
Odin et al.

[11] Patent Number: 6,029,801
[45] Date of Patent: Feb. 29, 2000

[54] FLEXIBLE CONVEYOR BELT AND A CONVEYOR MAKING USE THEREOF

[75] Inventors: Jean-Paul Odin; Jean-Paul Pelissou, both of Argentieuil, France

[73] Assignee: S.F.B.T. Societe Francaise de Bandes Transporteuses, Argenteuil, France

[21] Appl. No.: 09/045,990

[22] Filed: Mar. 23, 1998

[30] Foreign Application Priority Data

Mar. 25, 1997 [FR] France .................................... 97 03609

[51] Int. Cl.⁷ ............................ B65G 15/36; B65G 15/40
[52] U.S. Cl. .......................... 198/847; 198/819; 198/825
[58] Field of Search ..................... 198/847, 819, 198/825

[56] References Cited

U.S. PATENT DOCUMENTS

| | | | |
|---|---|---|---|
| 2,839,180 | 6/1958 | Ackers | 198/819 |
| 5,060,787 | 10/1991 | Tingskog | 198/847 |
| 5,351,810 | 10/1994 | Tingskog | 198/847 |

FOREIGN PATENT DOCUMENTS

| | | | |
|---|---|---|---|
| 1340919 | 9/1963 | France . | |
| 1358636 | 3/1964 | France | 198/819 |
| 2604983 | 4/1988 | France . | |
| 4113626 | 10/1992 | Germany . | |
| 4436042 | 4/1996 | Germany . | |
| 2152000 | 7/1985 | United Kingdom . | |
| 8101697 | 6/1981 | WIPO . | |
| 8602621 | 5/1986 | WIPO . | |

Primary Examiner—Christopher P. Ellis
Assistant Examiner—Mark Deuble
Attorney, Agent, or Firm—Larson & Taylor

[57] ABSTRACT

The flexible conveyor belt is flat when at rest. It has internal reinforcement embedded in layers of elastomer material. The reinforcement comprises a first sheet of longitudinal cables that provide traction strength, a second sheet of transverse cables that provide transverse traction strength, and a stiffening layer having high resistance to transverse compression. The stiffening layer consists of several narrow strips lying in a common plane at rest, the strips are mutually adjacent and are separated by gaps of sufficient width to allow the conveyor belt to be folded between two rows of rollers in a conveyor.

9 Claims, 2 Drawing Sheets

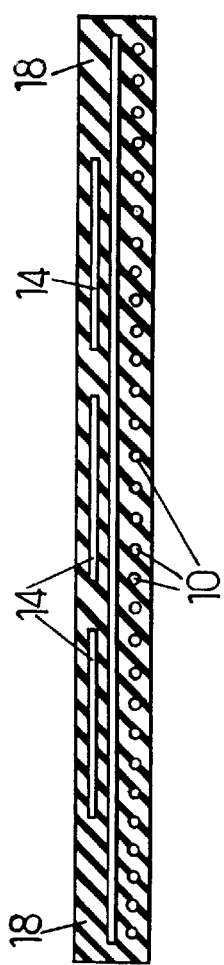
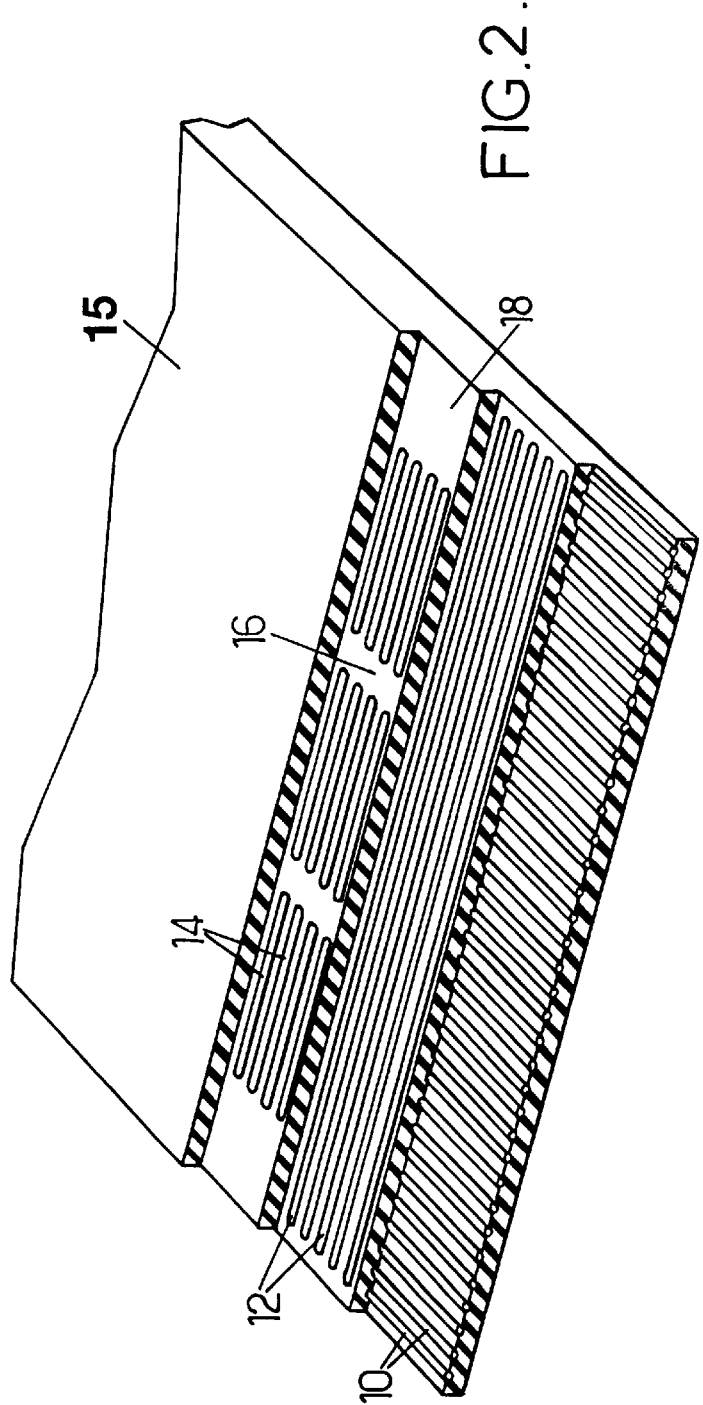

FLEXIBLE CONVEYOR BELT AND A CONVEYOR MAKING USE THEREOF

BACKGROUND OF THE INVENTION

The present invention relates to a flexible conveyor belt that is flat in shape when at rest ; the belt comprises internal reinforcement embedded in layers of elastomer material, said reinforcement comprising a first sheet of longitudinal cords providing the belt with longitudinal traction strength, a second sheet of transverse cords providing the belt with transverse traction strength, and a stiffening layer having high resistance to transverse compression relative to the resistance to transverse compression of the second sheet.

Document EP-A-0 047 739 describes a belt of this type; the stiffening layer is narrow and received in the central portion of the belt; the width of the layer is substantially equal to the individual length of each roller belonging to a support row for the central portion of the belt in a conveyor. Belts of that structure can be used for transporting bulk materials in conveyors that have a plurality of parallel rows of rollers imparting the shape of a flat-bottomed trough to the belt.

SUMMARY OF THE INVENTION

An object of the present invention is to provide a belt that can be used in a belt conveyor designed to give an almost closed configuration to the belt, at least in a portion where it conveys material, thus reducing any risk of material escaping. If a conventional belt were used in such a conveyor, there would be a risk of the belt twisting up inside the support and guidance framework. Such twisting or pivoting of the belt can give rise to untimely spillage of the substance that is being conveyed.

It is an object of the invention to avoid that danger. To this end, it provides a conveyor belt of the kind defined above, comprising a stiffening layer made up of a plurality of narrow strips located in a common plane when the belt is unstressed, that are adjacent to one another, leaving gaps between one another of sufficient width to allow the conveyor belt to be folded between two rows of rollers.

By means of this disposition, the conveyor belt takes up a facetted shape when it is held captive between the rows of rollers belonging to the framework of a conveyor, and it is prevented from twisting about its axis.

The invention also provides a conveyor having at least three rows of supporting and guiding rollers, the rows defining bearing planes that impart a substantially closed section to a conveyor belt situated between them, said belt having at least one narrow central transverse stiffening strip constituted by mutually parallel transverse elements, said narrow strip being slightly smaller in width than the width of a row of rollers of the conveyor on which it rests during displacement.

Advantageously, there are at least as many narrow strips as there are rows of rollers on which the conveyor belt rests along its conveying path, the conveyor belt may typically be devoid of narrow strips facing those rows of rollers that serve merely to perform the function of closing the cross section thereof.

The above characteristics, together with others, will appear more clearly on reading the following description of particular embodiments of the invention, given as non-limiting examples.

The description refers to the accompanying drawings.

BRIEF DESCRIPTION OF THE DRAWINGS

FIG. 1 is a cross-sectional view of a belt constituting a particular embodiment of the invention, shown in rest state without any stress being applied thereto;

FIG. 2 is a perspective view of a fragment of the conveyor belt of FIG. 1, cut away in stages;

DETAILED DESCRIPTION

Figure 3:
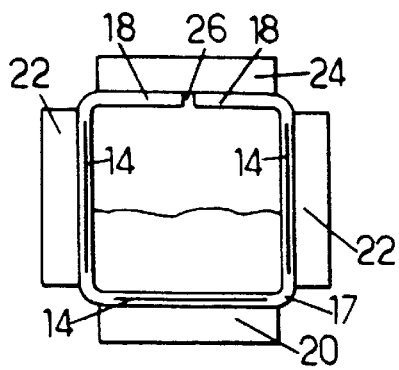
FIG. 3 is a cross-sectional view showing the shape taken up by the belt of FIGS. 1 and 2 in a particular conveyor.

The conveyor belt shown in FIGS. 1 and 2 is manufactured flat. It is of constant thickness from one edge to the other. It includes internal mechanical reinforcement or structure comprising a sheet 10 apt to withstand longitudinal tractive forces and that extends almost over the entire width of the belt, a sheet 12 apt to withstand tearing along a longitudinal line and that likewise occupies almost the entire width of the belt, and finally three narrow strips 14 each of which occupies a fraction of the width of the belt, and each of which is apt to withstand transverse compression and also to prevent the belt from taking up a rounded section.

The sheets 10 and 12 and the narrow strips 14 are embedded in an elastomer body 15 made in such a manner that the thickness of the sheet is substantially constant from one edge to the other. The body projects sideways beyond the sheets. This elastomer may be constituted, in particular, by cured rubber.

The sheet 10 which is closest to the support rollers for the belt in a conveyor is made up of longitudinal cords. For a metal-reinforced conveyor belt, these cords are parallel. They may also constitute a plurality of textile fiber plies, with the term "textile" being interpreted broadly and including not only natural fibers but also high strength synthetic fibers. The sheet 10 is made to ensure that the conveyor belt has the required traction strength while enabling the belt to pass over deflection rollers when transverselly flat.

The sheet 12 is designed to give the conveyor belt the required strength to withstand transverse traction forces, while still allowing bends to be formed about longitudinal lines of the belt. It is made up of cords extending transversely to the conveyor belt, parallel to one another. These cords are generally made of metal. Nevertheless they could be made of textile, in which case they may be distributed into one or more plies. The sheet 12 is preferably placed in the middle of the thickness of the belt so as to lie in the same plane as the neutral fiber of the belt in transverse bending. It is thus not subjected to significant extension or compression forces when the belt is folded about a longitudinal line.

The narrow strips 14, (three in number in the embodiment shown in FIGS. 1, 2 and 3), are designed to stiffen longitudinal zones of the conveyor belt transversely so as to prevent the conveyor belt from taking up a rounded section in the framework of a conveyor. The narrow strips are placed on that side of the middle sheet 12 that is opposite from the side of the sheet 10. Each narrow strip is made up of stiff transverse elements that are generally made of metal. The elements may be rods or blades. If they are blades, then they are of sufficiently small longitudinal size to avoid hindering winding the conveyor belt round a return roller.

Gaps 16 are provided between the narrow strips 14 and in these gaps the belt has low resistance to bending about a longitudinal line. In addition, the narrow strips 14 stop at a distance from the edges of the conveyor belt so as to leave lateral zones 18 that are not reinforced against bending. These lateral zones 18 generally correspond to portions of the conveyor belt which, when the conveyor belt Is in a zone where it is conveying materials, do not have to support the weight or lateral thrust from said materials.

FIG. 3 is a diagram showing an advantageous disposition of the narrow strips 14 in a belt for a conveyor that has four rows of rollers in its zone for conveying materials. One row 20 supports the central portion of the conveyor belt. The rollers in this zone 20 are of an axial length that is slightly greater than the width of the middle narrow strip 14. The length of the rollers 22 having vertical axes is slightly greater than the width of the lateral narrow strips 14. They cause the zones of the conveyor belt that contain these lateral strips to take up a vertical position. Finally, the rollers of a top row 24 close the conveyor belt onto itself by exerting pressure on the lateral zones 18. It can be seen that the portions of the conveyor belt that need to withstand the weight of and lateral pressure from the material being conveyed are reinforced by the narrow strips 14. These narrow strips hold the corresponding zones of the conveyor belt in flat condition and prevent the cross-section thereof from deforming into a rounded shape, which shape would provide inadequate opposition to the conveyor belt twisting so that the gap 26 takes up a lateral position.

Figure 4:
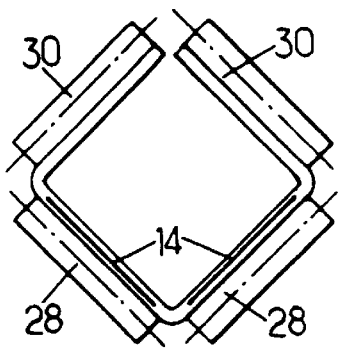
FIGS. 4 to 7 show other possible ways in which the narrow strips can be distributed in a conveyor belt, and designed respectively for conveyors that impart to the belt a section that is square, triangular, pentagonal, or hexagonal.

In the modified embodiment shown in FIG. 4, the conveyor belt is supported by torso rows of rollers 28 that are at 45° to the vertical, thereby forming a V-shape. The conveyor belt is closed onto itself by two additional rows of rollers 30 that are parallel in pairs with the rollers in the rows 28. In this case, the conveyor belt has only two narrow strips 14.

Figure 5:
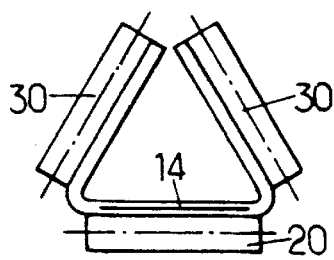

In the modified embodiment shown in FIG. 5, the framework of the conveyor has only one row 20 of horizontal axis support rollers. It has two rows 30 of closure rollers, with the set of rollers imparting a triangular section with a flat horizontal bottom to the belt. Only one narrow strip 14 is provided.

Figure 6:
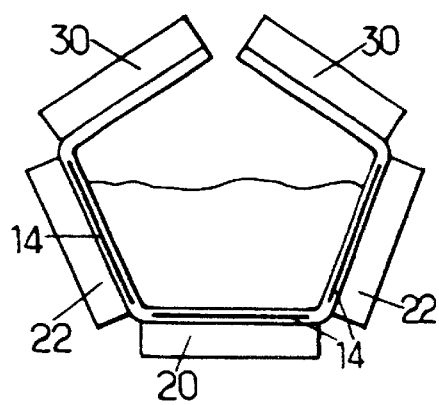

In the embodiment of FIG. 6, the framework of the conveyor has a single horizontal axis row 20 of rollers, two rows 30 of closure rollers, and two rows 22 of lateral rollers that need to withstand lateral pressure from the conveyed substance. Unlike the rollers 22 of FIG. 2, those of FIG. 6 have axes that converge downwards. In this way, the framework gives the conveyor belt a pentagonal section in a zone where it conveys material. The conveyor belt includes narrow strips 14 only in those portions that co-operate with the rows 20 and 22 of rollers.

Figure 7:
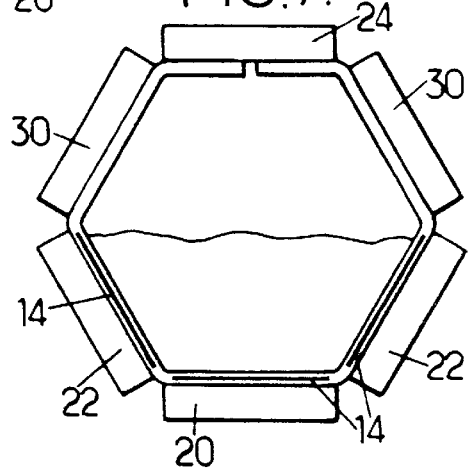

In FIG. 7, the framework is designed to impart a regular hexagonal section to the conveyor belt in its transport zone. The framework again has a horizontal row of support rollers 20, a top closure row 24 performing the same function as in the example shown in FIG. 3, two sloping rows 22 for withstanding a component of the weight of and the lateral thrust from the material being conveyed, and finally two rows of rollers 30 that perform a function similar to the rollers 30 in FIG. 6. It may be observed that the risk of the belt taking up a rounded section and twisting increases as the shape of the set cross-section is closer to a circle. That amounts to saying that the risk increases with increasing number of faces in the cross-section. In FIG. 7, the risk is reduced by the presence of three narrow strips 14 facing the rows of rollers 20 and 22. The risk can be further reduced by providing additional narrow strips facing the rows of rollers 30.

In some cases, the belt is intended for a conveyor that has rising portions that are designed to raise the material being conveyed. In which case, the conveyor belt may also have lugs, plates, or vanes which, once the conveyor belt has been "closed" in cross-section by the rollers of the framework, constitute partitions that leave little leak space.

Figure 8:
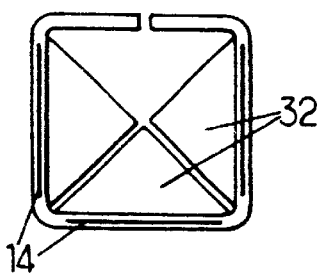
FIG. 8 is similar to FIG. 3 and shows a belt provided with vanes.
Figure 9:
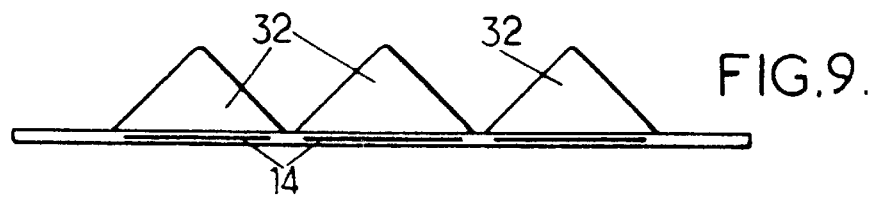
FIG. 9 is a section view of the belt shown in FIG. 8, while in released condition.

FIGS. 8 and 9 show a belt of the same kind as that illustrated in FIG. 3 but further including triplets of triangular vanes 32 at regular intervals in the longitudinal direction, each vane coinciding with a respective one of the narrow strips 14. These vanes are triangular in shape so that when the conveyor belt is folded over, they take up adjacent positions to constitute partitions occupying the major portion of the internal cross-section of the conveyor belt (FIG. 8).

Figure 10:
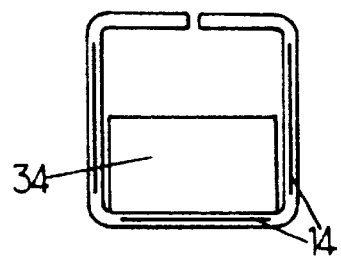
FIG. 10 is similar to FIG. 3 and shows a conveyor belt provided with vanes and intended for use in a conveyor that imparts a square section thereto in its material-conveying zone.

FIG. 10 shows that a conveyor belt of the kind shown in FIGS. 1 to 3 may also have vanes 34 of rectangular shape that are secured to the conveyor belt, with their roots facing the middle narrow strip 14. The vane shown in FIG. 10 is rectangular in shape so that its edges come close to the side faces of the cross-section of the folded conveyor belt. Each vane projects substantially halfway up the height of the associated cross-section. Other disposition are possible, and in particular a vane 34 may be of a size such that it practically closes the inner cross-section when the conveyor belt is intended for an elevator whose path includes portions that are substantially vertical.

We claim:

1. A flexible conveyor belt flat in shape when in released condition, comprising internal reinforcement means embedded in layers of elastomer material, wherein said reinforcement means comprise:

a first sheet of longitudinal cords occupying substantially the whole width of the belt for providing the belt with resistance to longitudinal traction, a second sheet of transverse cords occupying substantially the whole width of the belt for providing the belt with strength against tearing along a longitudinal line, and a stiffening layer having high resistance to transverse compression as compared with the resistance to transverse compression of the second sheet, said stiffening layer comprising a plurality of mutually adjacent narrow strips lying in a common plane in released condition of said belt and each strip occupying a fraction only of the width of the belt, said strips being each apt to withstand transverse compression and being separated by longitudinally directed gaps of sufficient width to allow the conveyor belt to be folded along each of said gaps by adjacent rows of rollers of a conveyor.

2. A conveyor belt according to claim 1, wherein said narrow strips are situated on a side of the sheet of transverse cords opposite from a side on which the sheet of longitudinal cords is situated.

3. A conveyor belt according to claim 1, wherein the sheet of transverse cords is placed in a neutral plane of the conveyor belt in transverse bending.

4. A conveyor belt according to claim 1, wherein said stiffening layer comprises one said middle narrow strip and two said narrow strips that end at a distance from longitudinal edges of the conveyor belt and that leave lateral zones of said belt devoid of said stiffening strip, said lateral zones having a cumulative total width substantially equal to the width of said middle one of said stiffening strips.

5. A conveyor belt according to claim 4, having a plurality of transversal inner vanes projecting therefrom and having a transversal extent substantially equal to a width of a middle one of said strips.

6. A conveyor belt according to claim 1, wherein each of said strips consists of longitudinally distributed elements directed transversely to the belt.

7. A flexible conveyor belt flat in shape when in released condition, comprising internal reinforcement means embedded in layers of elastomeric material, wherein said reinforcement means comprise:
- a first sheet of longitudinal cords for providing the belt with resistance to longitudinal traction,
- a second sheet of transverse cords providing the belt with strength against tearing along a longitudinal line, and
- a stiffening layer comprising at least three mutually adjacent longitudinally directed narrow strips lying in a common plane in released condition of said belt and having high resistance to transverse compression as compared with the resistance to transverse compression of the second sheet, said strips being separated by longitudinal gaps of sufficient width to allow the conveyor belt to be folded along each of said gaps by adjacent rows of rollers of a conveyor and each comprising longitudinally distributed stiff transverse elements.

8. A conveyor belt according to claim 7, further having a plurality of rows of longitudinally spaced transversal inner vanes projecting therefrom, each of said rows having a transversal extent substantially equal to a width of one of said strips and each coincident with one of the narrow strips.

9. A conveyor having:
- at least three rows of longitudinally distributed supporting and guiding rollers, and
- a conveyor belt flat in shape when in released condition and retained between said rows,
  said belt having:
    - a first sheet of longitudinal cords providing resistance to longitudinal tensile forces,
    - a second sheet of transverse cords providing resistance against tearing under the action of transverse forces and
    - a stiffening layer having a plurality of mutually adjacent narrow strips having high resistance to transverse compression as compared with the resistance to transverse compression of the second sheet, lying in a common plane in released condition of said belt, each constituted by mutually parallel longitudinally distributed transverse elements and each occupying a fraction of a width of the belt, each having a high degree of resistance to bending about a longitudinal direction, some at least of said narrow strips each having a width close to and smaller than a width of one of said rows of rollers of the conveyor on which it rests during movement of said belt and said strips being separated by longitudinal gaps of sufficient width to allow the conveyor belt to be folded along each of said gaps by adjacent rows of rollers of the conveyor.

* * * * *